(No Model.)
G. W. FINK.
Check Row Seed Planters.
No. 234,555. Patented Nov. 16, 1880.
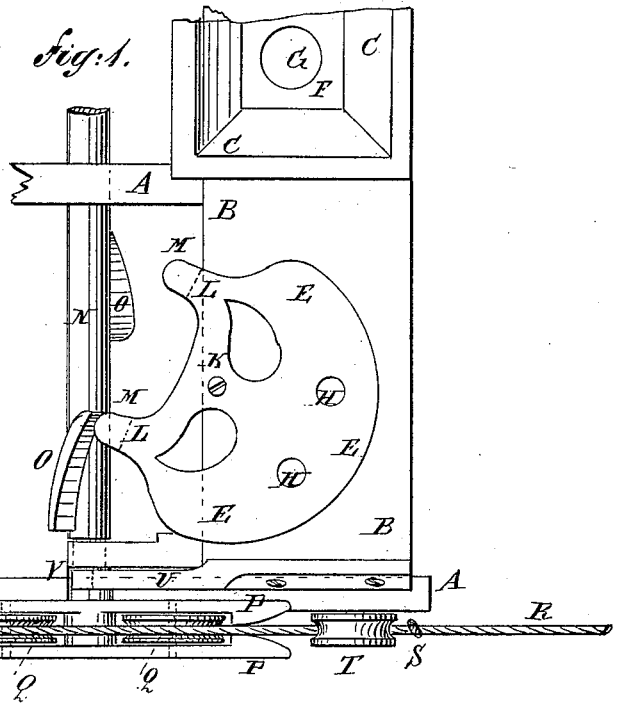
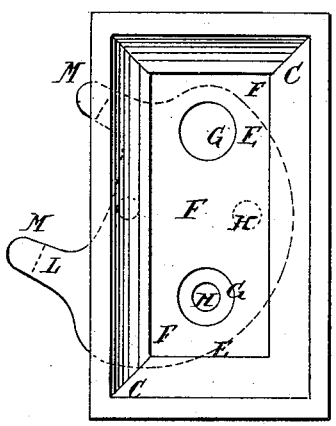
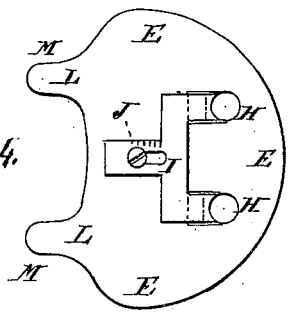
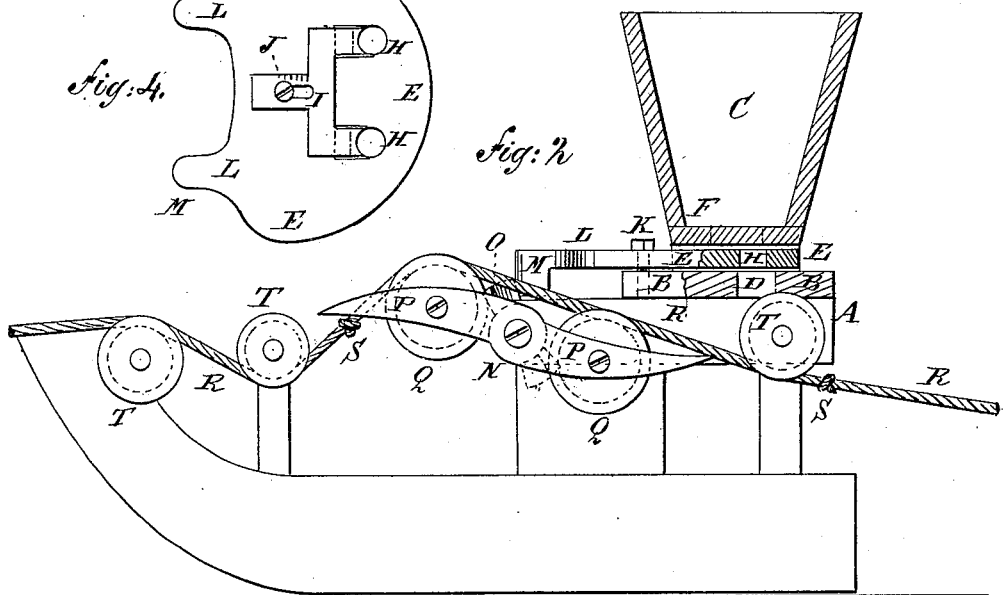
WITNESSES:
Chas. Nida
C. Sedgwick
INVENTOR:
G. W. Fink
BY Munn & Co.
ATTORNEYS.

United States Patent Office.

GEORGE W. FINK, OF PLEASANT PLAINS, ILLINOIS.

CHECK-ROW SEED-PLANTER.

SPECIFICATION forming part of Letters Patent No. 234,555, dated November 16, 1880.

Application filed August 5, 1880. (No model.)

*To all whom it may concern:*

Be it known that I, GEORGE W. FINK, of Pleasant Plains, in the county of Sangamon and State of Illinois, have invented a new and useful Improvement in Check-Row Seed-Planters, of which the following is a specification.

Figure 1 is a plan view of the improvement. Fig. 2 is a side elevation. Fig. 3 is a plan view of the seed-box and seed-dropping plate. Fig. 4 is a plan view of the seed-dropping plate and its gage. Fig. 5 represents the spring-catch, pawl, and ratchet-wheel.

This invention relates to that class of check-row seed-planters in which the seed-dropping mechanism is actuated by a rope stretched across the field; and has for its object to simplify the construction, lessen the weight, and increase the reliability of the seed-dropping mechanism, and thus furnish seed-planters easily operated and accurate in operation.

The invention consists in the combination, with the frame, the seed-slide, the cam-shaft, and the rope, of the cross-bar, provided with two arms curved in opposite directions and slotted longitudinally, the inner parts of said slots being enlarged and in them journaled pulleys and the pulleys secured to the frame; and in the combination, with the rope and the cross-bar, of the cam-shaft, the horizontally-pivoted seed-slide, provided with arms having downwardly-projecting lugs and adjustable apertures, as hereinafter fully described.

Similar letters of reference indicate corresponding parts.

A represents a part of the frame of a seed-planter. B represents the platform, board, or bar that supports the seed-boxes C, and through which is formed a discharge-hole, D, for the seed to pass into the conductor-spout and drop to the ground. E is the seed-dropping plate, which is placed between the platform B and the bottom F of the seed-box C, and is pivoted to the said platform B.

In the end parts of the bottom F of the seed-box C are formed two holes, G, through which the seed passes to the seed-dropping plate E.

In the seed-dropping plate E are formed two holes, H, which receive seed alternately from the seed-box C and carry it to the discharge-hole D of the platform B. The seed-dropping holes of the plate E are made of such a size as to contain the required amount of seed for a hill, and are prevented from carrying out any more seed than enough to fill them by cut-offs attached to the bottom F between the holes G and over the discharge-hole D of the platform. The same plate E may be made to drop more or less seed for a hill by elongating the holes H and partially closing the slots thus formed by the arms of a gage-plate, I, which is slotted to receive the screw J, that secures it to the plate E. The seed-dropping plate E is pivoted to the platform B by a bolt, K, and upon it at the ends of its forward side are formed, or to it are attached, two arms, L, having downwardly-projecting lugs M formed upon their forward ends.

N is a shaft, which is placed in front of the seed-dropping plate E, and revolves in bearings attached to the frame A. Upon the shaft N are formed, or to it are attached, curved or inclined flanges or cams O in such positions as to strike the lugs M alternately, and thus oscillate the plate E to drop the seed.

To each end of the shaft N is attached a cross-bar, P, the arms of which are slightly curved and are slotted longitudinally. The inner parts of the slots of the arms of the bars P are enlarged to receive the grooved pulleys Q, over which passes the rope R. The rope R is stretched across the field, and is provided with buttons or knots S at regular intervals, in the usual manner. The outer parts of the slots in the arms of the cross-bars P are so formed that the body of the rope R can readily enter and pass through them, but not the knots S, so that as each knot S reaches the slot in an arm of the bar P it will carry the said arm with it to the other side of the shaft N, and thus revolve the shaft through a half-revolution, moving the plate E and dropping the seed for a hill. This movement will be repeated with each knot S.

The rope R is brought into proper position, as it enters and leaves the cross-bar P, by guide-pulleys T, pivoted to the frame-work of the planter. The cross-bar P is held from being pressed back by the tension and weight of the rope R out of the position in which it is left by the knots S by a spring-catch, U, attached to the frame A, and which engages with one or the other of the teeth of the two toothed ratchet-wheel V, attached to or formed upon the shaft N.

Having thus fully described my invention, I claim as new and desire to secure by Letters Patent—

1. In a check-row seed-planter, the combination, with the frame A, the seed-slide E, the shaft N, provided with cams O, and the rope R, provided with the knots S, of the cross-bar P, provided with two arms curved in opposite directions and slotted longitudinally, the inner parts of the said slots being enlarged, the pulleys Q, secured in the said enlarged parts of the said arms, and the pulleys T, secured to the frame, substantially as and for the purpose set forth.

2. In a check-row seed-planter, the combination, with the rope R and the cross-bar P, of the shaft N, provided with the cams O, and the horizontally pivoted seed-slide E, provided with the arms L, having downwardly-projecting lugs M and adjustable apertures H, substantially as and for the purpose set forth.

GEORGE W. FINK.

Witnesses:
W. E. BEEKMAN,
FRIEDRICH HAGEN.